United States Patent [19]
Morrell et al.

[11] 3,839,605
[45] Oct. 1, 1974

[54] MOUNTING FOR TELEPHONE DIALS

[75] Inventors: Ronald Joseph Morrell; Graham Sterling Laing; Bev William Gumb, all of London, Ontario, Canada

[73] Assignees: Bell-Northern Research Ltd., Ontario, ; by said Laing; Northern Electric Company Limited, Montreal, both of, Canada; by said Morrell & Gumb

[22] Filed: May 9, 1973

[21] Appl. No.: 358,495

[52] U.S. Cl. ............................................... 179/178
[51] Int. Cl. ............................................ H04m 1/02
[58] Field of Search........... 179/178, 100 R, 100 D, 179/179

[56] References Cited

UNITED STATES PATENTS 3,126,454 3/1964 Fresk et al. .................... 179/100 D

*Primary Examiner*—Thomas W. Brown
*Attorney, Agent, or Firm*—Sidney T. Jelly

[57] ABSTRACT

Telephone dials are mounted in the telephone unit housings by removable brackets. The brackets form an opposed pair, having offset mounting positions. By this means dials of different widths, eg. rotary dials and pushbutton dials- can be mounted by reversing the position of the brackets. Variations in mounting height can also be accommodated. A subordinate feature is a clip-in mounting in the housing for the brackets.

8 Claims, 7 Drawing Figures

MOUNTING FOR TELEPHONE DIALS

This invention relates to the mounting of telephone dials in telephone sets, and in particular to the mounting of either rotary or pushbutton dials, using common mounting brackets. The invention further relates to the attachment of such brackets to the telephone set.

It is possible to provide either rotary or pushbutton dials for telephone sets, but the structure of the dials differs and it is not normally possible to use the same mountings for both dials. For example the attachment points on a rotary dial are usually wider apart than on a pushbutton dial. Furthermore the height of the attachment points may differ relative to a common datum.

As a result it is usual to provide alternative forms of mounting brackets for the two alternative dial forms. The invention provides mounting brackets which, by alternative positioning in the telephone set, can be used to mount either of the dials. A further feature of the present invention is the provision of means for quickly and easily attaching the mounting brackets to the telephone set housing, the brackets being quickly and easily removed and reinserted.

Broadly, the present invention provides a mounting for telephone dials comprising a pair of mounting brackets, the brackets forming an opposed pair, and having offset mounting positions, such that in one related opposed position mounting for one form of dial is provided, while in another related opposed position, mounting for an alternative form of dial is provided.

In accordance with a further feature of the invention, the brackets are mounted on the telephone housing by attachment means comprising an anchorage position for retention of a projection on one end of a bracket and a resilient support and retaining member for retention of the other end of a bracket, with guide and support means extending between the anchorage and the support and retaining member for acceptance of one edge of the bracket.

This invention will be readily understood by the following description of one embodiment, by way of example, in conjunction with the accompanying drawings, in which.

Figure 2:
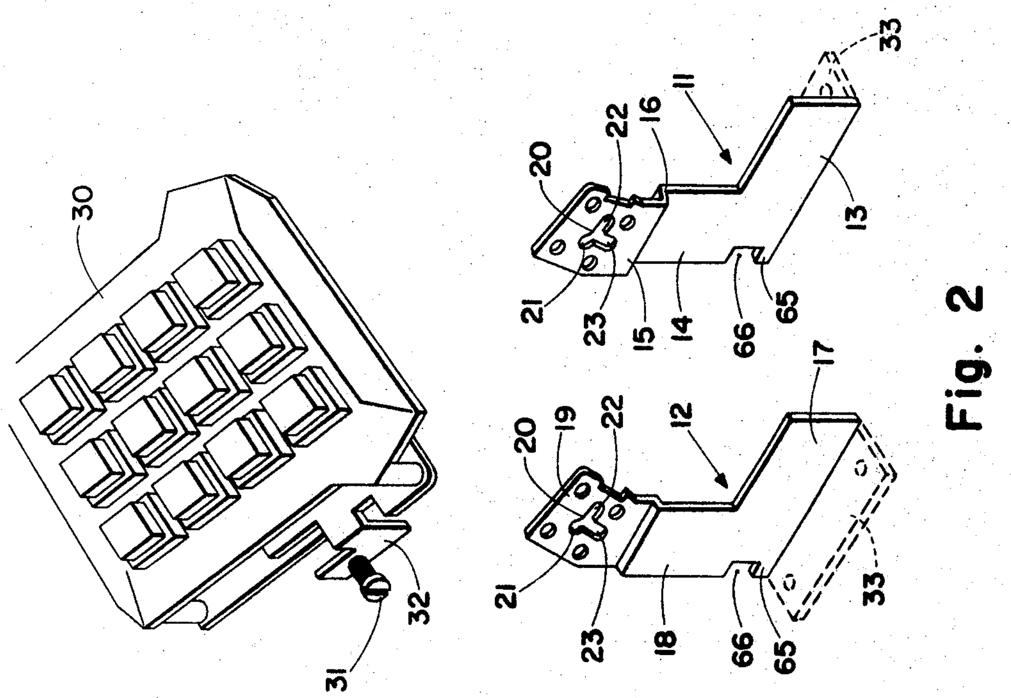
FIG. 2 is a perspective view of a pair of mounting brackets of FIG. 1 in the alternative opposed position, with the alternative dial form spaced therefrom.
Figure 1:
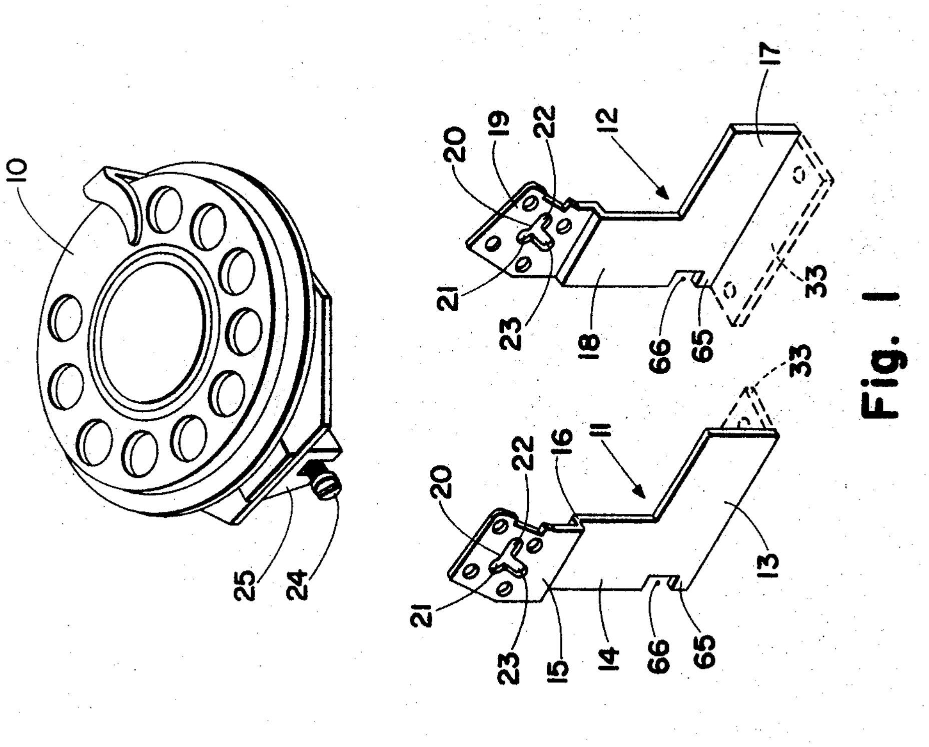
FIG. 1 is a perspective view of a pair of mounting brackets in one opposed position, with the related dial spaced therefrom.

Illustrated in FIGS. 1 and 2 are two alternative arrangements for mounting a telephone dial. FIG. 1 illustrates a rotary dial, 10, which is mounted in the telephone set by a pair of brackets 11 and 12. The brackets 11 and 12 are an opposed pair in that they are of opposed hand. Thus, as seen in FIG. 1, bracket 11 is formed from an L-shaped piece of metal sheet or plate with a base leg 13 and an upward extending leg 14. Leg 14 has a portion 15 which is displaced from the plane of the main part of the leg, by a double or cranked bend 16. The plane of the portion 15 is parallel to but displaced from the plane of the main part of leg 14. Bracket 12 is of similar construction, with a base leg 17, and upward extending leg 18. Leg 18 has a portion 19, the plane of which is parallel to but displaced from the plane of the main part of leg 12. In the arrangement of FIG. 1, for supporting a rotary dial, the brackets 11 and 12 are mounted so that the portions 15 and 19 are displaced in a direction away from each other — to give a spacing which is wider than that between the main parts of legs 14 and 18. Formed in the portions 15 and 19 are apertures 20. Each aperture 20 has a relatively large radius portion 21 and two extensions 22 and 23 of rather small radius. The large radius portion 21 is such that the head of screw 24 in the attachment bracket 25 of rotary dial 10 will pass through this portion. The dial is then moved so that the shank of the screw 24 enters one or other of the extensions 22 and 23. For a rotary dial the screw is positioned in the extension 22.

For mounting a pushbutton dial 30, as illustrated in FIG. 2, the brackets 11 and 12 are reversed so that the portions 15 and 19 are displaced in a direction toward each other, giving a spacing which is less than that between the main parts of legs 14 and 18. To mount the pushbutton dial 30, the heads of screws 31 in attachment brackets 32 are passed through the large radius portions 21 of the apertures 20, and then the dial is moved so that the shanks of the screws enter the extensions 23.

Thus there is provided a mounting which is acceptable to accept different attachment point spacings and heights, without provision of adapters, extra parts or loose parts. The brackets 11 and 12 can be quickly and easily mounted in the telephone set housing and readily removed and replaced and can be removed and changed over when a different dial is to be mounted. The brackets can be attached in various ways. One example is by screws passing through flanges formed on the bottom edges of the base legs 13 and 17. A possible arrangement is indicated by dotted lines 33 in FIGS. 1 and 2. More conveniently the brackets can be mounted in formations on the base of the telephone housing, as described hereinafter, to provide easy mounting and removal.

Figure 3:
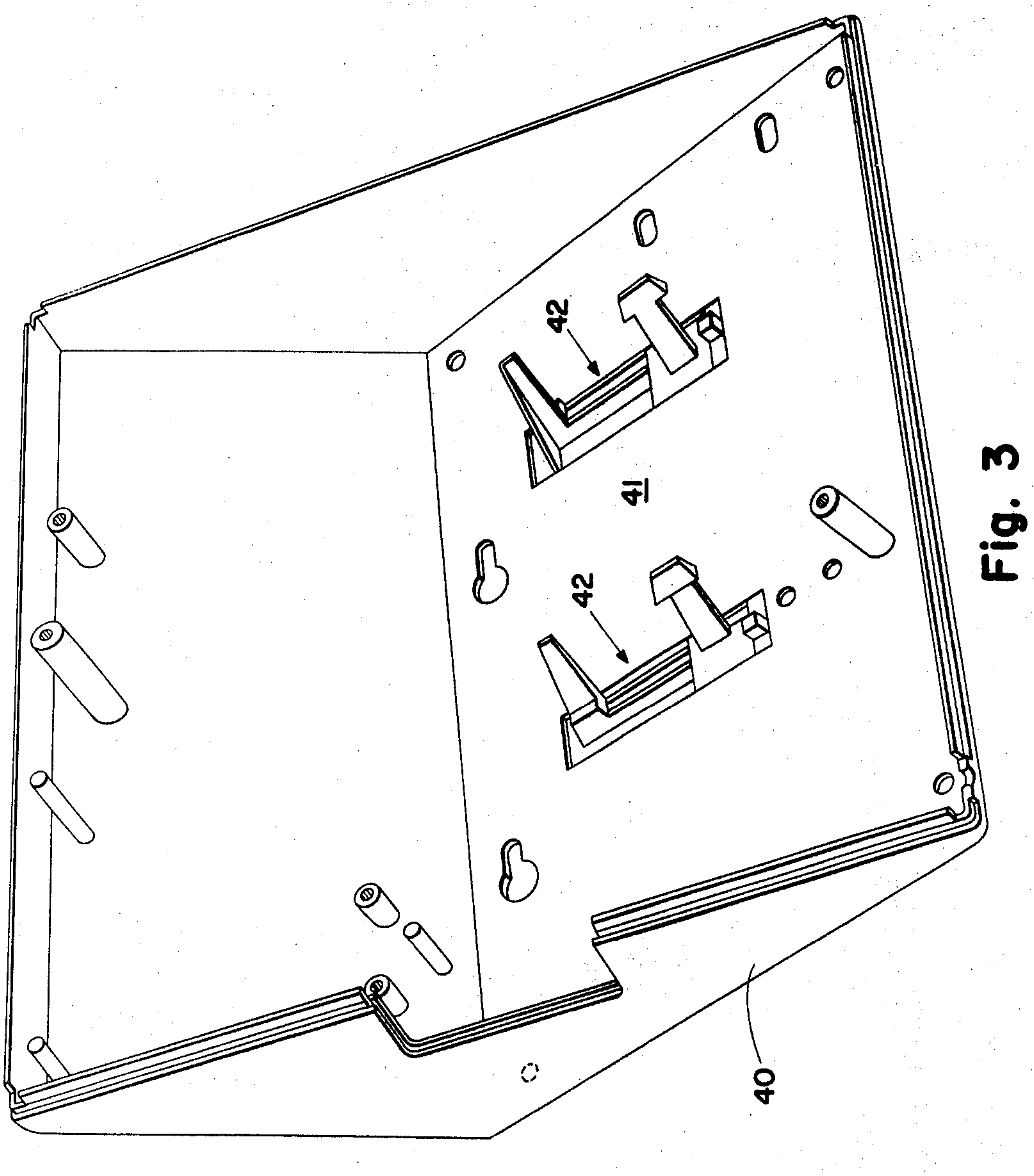
FIG. 3 is a perspective view of a bottom housing of a telephone set showing the one form of attachment for the dial mounting brackets.
Figure 4:
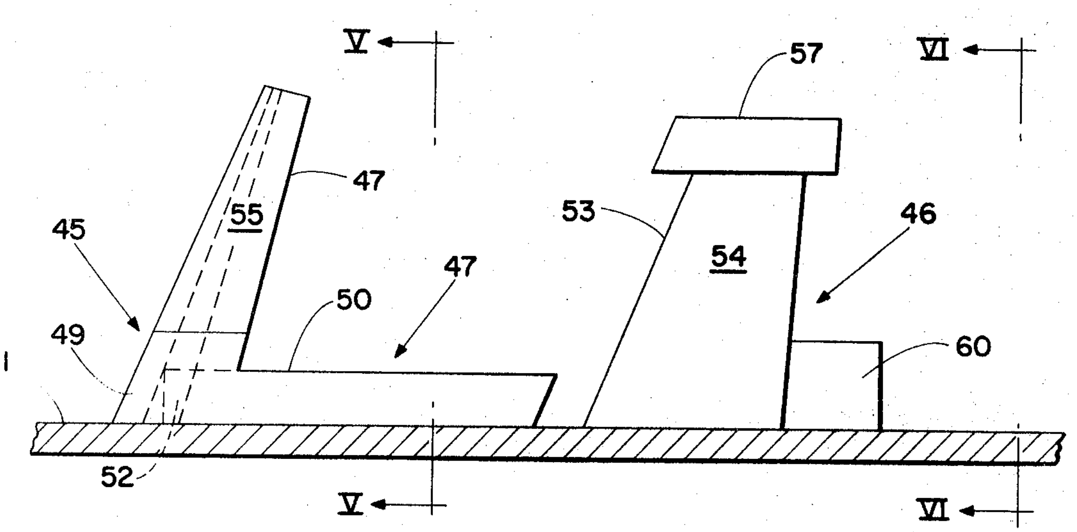
FIG. 4 is a side view of one bracket support and mounting.
Figure 5:
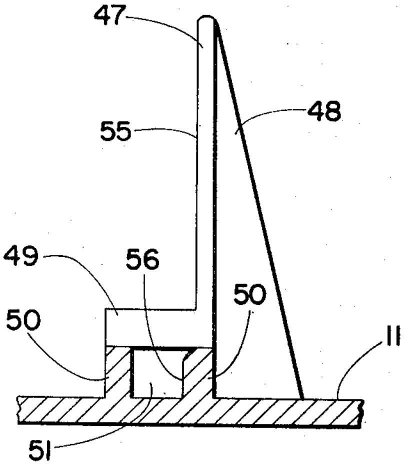
FIG. 5 is a cross-section on the line V—V of FIG. 4.
Figure 6:
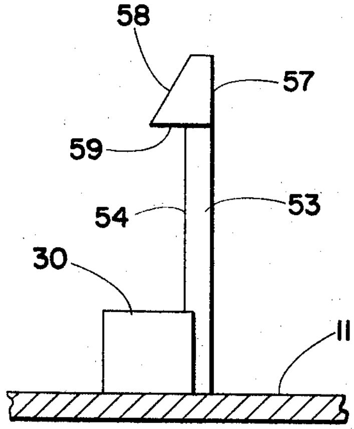
FIG. 6 is a cross-section on the line VI—VI of FIG. 4.

Illustrated in FIG. 3 is the base or bottom housing 40 of a telephone set. In the particular example housing 40 is molded of plastics material and molded integrally with the bottom surface 41 are two bracket supports and mountings 42. The form of brackets 42 is seen more clearly in FIGS. 4, 5 and 6. Each bracket comprises a locating member and anchorage 45, a support and retaining member 46, and guide and support means 47 extending between anchorage 45 and retaining member 46. The mountings 42 are formed as an opposed pair, as illustrated in FIG. 3.

The locating member and anchorage 45 comprises a fairly rigid locating portion 47 which extends upwardly, normal to the bottom surface 41, and inclined slightly toward the retaining member 46. The rigidity of the locating portion is enhanced by a web 48 on the rear surface of the locating portion. At the base of the locating portion 47 is a stop 49. Stop 49 locates one end of a bracket as will be described. In the example illustrated, the guide and support means 47 is an extension of the locating member and anchorage 45, comprising two parallel ribs 50, spaced apart to define a channel 51 which is slightly wider than the thickness of a bracket. The channel 51 continues rearward, as seen in the drawings, into the stop 49 to form an enclosed recess or anchorage 52. As described later, the anchorage 52 receives an extension on a bracket. The support and retaining member 46 is aligned with the locating member 45 and the guide and support means 47 and is in the form of a resilient web 53 extending normal to the bottom surface 41 and may also be inclined slightly away from the locating member 45. The web is positioned so that it has one face 54 in the same plane as face 55 on the locating member, this plane also common to a side face 56 of the channel 51. When a bracket is in position one surface of the bracket is coincident with this plane. At the upper end of the web 53 is an enlargement 57 which extends from the face 54. The upper surface 58 of the enlargement 57 is inclined downwards, as illustrated. The bottom surface 59 of enlargement 57 is normal to the face 54. A further stop 60 is formed at the base of the retaining member 46 on the side remote from the locating member 45. As stated above, mountings 42 are an opposed pair, the form reversed for one bracket relative to the other.

The brackets 11 and 12 can be inserted in the bracket support and mountings 42 prior to attachment of the particular dial to be installed. However, by assembly of dial and brackets as a unit, the easy mounting facility of the bracket mountings 42 is utilized to maximum benefit. Assembly of the dial itself is a separate operation, and attachment of the brackets 11 and 12 can be made part of the operation. The whole unit can then be "snapped in." If a dial is to be replaced in service, either with a dial of the same type or with a different type of dial, the assembly is readily removeable. Either a new assembly of dial and brackets can be installed, or the brackets from the removed dial are transferred to the new dial, the particular installation of the brackets depending upon the type of dial.

Figure 7:
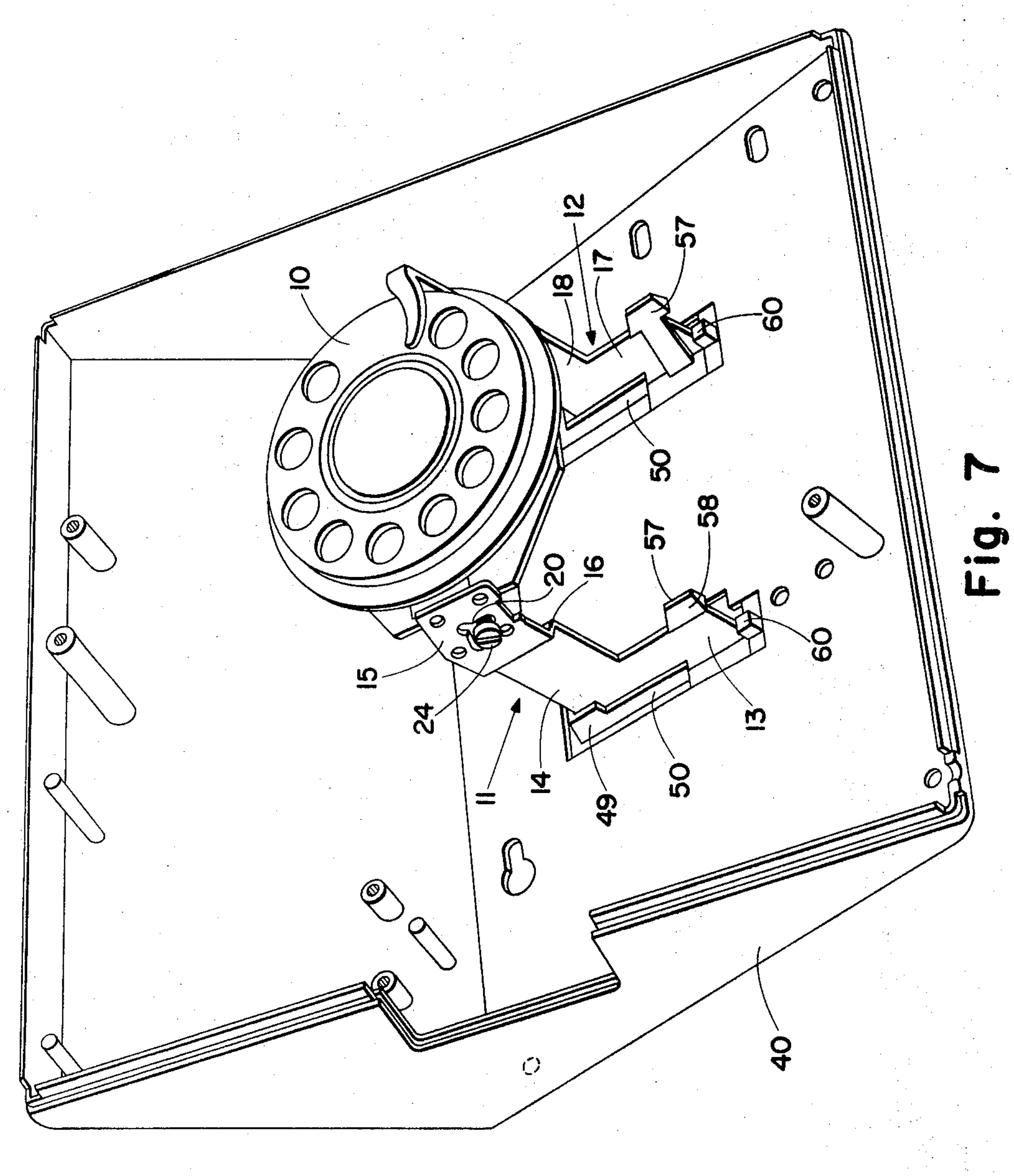
FIG. 7 is a perspective view, similar to that of FIG. 3, showing a dial assembly in plane in a housing.

Assuming brackets have been attached to a dial, installation of the assembly is as follows. When a rotary dial is to be fitted, brackets 11 and 12 are attached to the rotary dial as illustrated in FIG. 1. The assembly is then held — for example by grasping the assembly with the dial between the thumb and first finger and facing the palm. The back corners of the base legs 13 and 17 are positioned in the channels 51 of the mountings 42. Each back corner is formed to provide an extension 65 by the cutting of a notch 66. The back corners are slid rearwardly along the channels 51 until the extensions 65 enter the recesses or anchorages 52. The assembly is then pivotted downwardly the legs 14 and 18 in contact with the faces 55 of the locating members 45. The forward ends of legs 13 and 17 move down the inclined surfaces 58, and the webs 53 deflect. Continued movement of the assembly causes the front ends of the legs 13 and 17 to clip under the enlargements 57, being in contact with the under surfaces 59. The legs are also in contact with the faces 54. Each bracket is held firmly in place, positioned by the channels 51 and held and located by the extensions 65 in the recesses or anchorages 51 and by the enlargements 57 of the locating members 56. Stops 60 prevent forward movement of the brackets. A rotary dial is illustrated installed in FIG. 7.

The assembly is easily removed. The dial and bracket assembly is gripped with one hand and thumb and first finger of the other squeeze the locating members 56 towards each other -deflecting resilient webs 53 and moving the enlargements 57 out of engagement with the brackets 11 and 12. The assembly is then pivotted upwards and moved forwards to disengage the extensions 56 from the recesses or anchorages 51. The assembly is then lifted free -restrained only by the electrical connections to the dial.

For a pushbutton dial the installation, and removal, is the same as for the rotary dial, the brackets merely being assembled to the dial in the appropriate reversed position.

It will be appreciated that mounting of other forms of dials, differing from those described, can also be provided by suitable adaption of the brackets at the position and attachment to the dial. Further, the attachment or mounting of the brackets in the housing can be used for the installation of assemblies or units other than dials.

What is claimed is:

1. A mounting for a telephone dial in a telephone housing, comprising two mounting brackets attached to opposite sides of the dial, the brackets an opposed pair, each bracket comprising a flat L-shaped piece of material and including a base leg and an upwardly extending leg extending from a forward end of said base leg, said dial attached to the upper end of said upwardly extending leg; a cranked portion at said upper end, said cranked portion extending in a plane substantially parallel to and spaced from a plane containing said upwardly extending leg; the plane of the cranked portion displaced from the plane of the upwardly extending leg in a first direction relative to said dial for one bracket and in a direction opposite to said first direction for the other bracket; and means in each cranked portion attaching the dial to the brackets.

2. A mounting as claimed in claim 1, said cranked portions displaced toward each other, the distance between the cranked portions less than the distance between the upwardly extending legs.

3. A mounting as claimed in claim 1, said cranked portions displaced away from each other, the distance between the cranked portions greater than the distance between the upwardly extending legs.

4. A mounting as claimed in claim 1, said means attaching the dial to the brackets comprising: an aperture including a common larger radius portion and two smaller radius portions extending from the larger radius portion, and a screw in said aperture, the shank of said screw in one of said smaller radius portions; the arrangement such that the head of said screw can pass through said larger radius portion and is moved to position said shank in said smaller radius portion.

5. A mounting as claimed in claim 1, including attachment means on a base surface of said housing, an attachment means for each bracket, each attachment means comprising:

a locating and anchoring member;

a resilient support and retaining member;

guide means extending between said locating and anchoring member and said support and retaining member;

said locating and anchoring member comprising: a stop portion; a recess in said stop portion and a locating portion extending from said stop portion in a direction away from said base surface of said housing;

said resilient support and retaining member comprising: a stop; a resilient web extending from said base surface of said housing; and a retaining portion at an end of said resilient web remote from said base surface;

said guide means comprising a pair of ribs spaced apart and substantially parallel to define a channel to receive a base portion of one of said brackets, the channel extending from said stop portion of said locating and anchoring member toward said resilient support and retaining member;

an extension on a bottom edge of each of said brackets, said extensions positioned in said recess in said locating and anchoring member, and a leg portion on each bracket positioning against said resilient web and under said retaining portion of said support and retaining member.

6. A mounting as claimed in claim 5; said locating portion of said locating and anchoring member including a face extending from said stop portion; said resilient web of said support and retaining member including a face extending in a common plane with said face of said locating portion; said common plane in substantial alignment with one edge of said channel in said guide means, the other edge of said channel spaced from said common plane, the arrangement such that one surface of a bracket is in contact with said faces and said one edge of said channel when said bracket is in position.

7. A mounting as claimed in claim 6, said retaining portion at said end of said resilient web comprising an enlargement extending laterally beyond said face at said web and having a lower surface in engagement with a surface on said leg portion of a bracket and an upper surface inclined downwardly and outwardly to intercept said lower surface.

8. A mounting as claimed in claim 6, said ribs of said guide means extending the full distance between said locating and anchoring member and said support and retaining member.

* * * * *